US007917818B2

(12) United States Patent
Niijima

(10) Patent No.: US 7,917,818 B2
(45) Date of Patent: Mar. 29, 2011

(54) SEMICONDUCTOR DEVICE CONTROLLING DEBUG OPERATION OF PROCESSING UNIT IN RESPONSE TO PERMISSION OR PROHIBITION FROM OTHER PROCESSING UNIT

(75) Inventor: Shinji Niijima, Kanagawa (JP)

(73) Assignee: Renesas Electronics Corporation, Kawasaki-shi, Kanagawa (JP)

( * ) Notice: Subject to any disclaimer, the term of this patent is extended or adjusted under 35 U.S.C. 154(b) by 280 days.

(21) Appl. No.: 12/081,823

(22) Filed: Apr. 22, 2008

(65) Prior Publication Data

US 2008/0263298 A1  Oct. 23, 2008

(30) Foreign Application Priority Data

Apr. 23, 2007  (JP) .................................. 2007-112763

(51) Int. Cl.
*G01R 31/28* (2006.01)
(52) U.S. Cl. ......................................... 714/724; 714/30
(58) Field of Classification Search .................... 714/30, 714/724
See application file for complete search history.

(56) References Cited

U.S. PATENT DOCUMENTS

| 5,625,785 | A  | * | 4/1997  | Miura et al. ................... 712/227 |
| 6,553,506 | B1 | * | 4/2003  | Hijikata et al. ............... 713/501 |
| 6,954,878 | B2 | * | 10/2005 | Kudo ............................... 714/30 |
| 7,185,244 | B2 | * | 2/2007  | Kojima et al. ................. 714/718 |
| 7,401,257 | B2 | * | 7/2008  | Usui ............................... 714/27 |
| 7,437,623 | B2 | * | 10/2008 | Larson et al. ................... 714/56 |
| 7,584,381 | B2 | * | 9/2009  | Kudo ............................... 714/30 |

FOREIGN PATENT DOCUMENTS

JP   2003-186693   7/2003

* cited by examiner

*Primary Examiner* — James C Kerveros
(74) *Attorney, Agent, or Firm* — McGinn IP Law Group, PLLC

(57) ABSTRACT

A semiconductor device includes a volatile memory for storing a first instruction group, a first processing unit for executing the first instruction group, a nonvolatile memory for storing a second instruction group, a second processing unit for executing a second instruction group, a control signal output unit for outputting a control signal to specify permission or prohibition of executing a debugging function to the first processing unit, and a debug control unit for controlling execution of the debugging function by the first processing unit based on the control signal.

22 Claims, 7 Drawing Sheets

SEMICONDUCTOR DEVICE CONTROLLING DEBUG OPERATION OF PROCESSING UNIT IN RESPONSE TO PERMISSION OR PROHIBITION FROM OTHER PROCESSING UNIT

BACKGROUND OF THE INVENTION

1. Field of the Invention

The present invention relates to a semiconductor device having a debugging function, and more particularly, to a debug control in the semiconductor device having a plurality of chips containing a processing unit, and a nonvolatile memory, and containing also a processing unit and a RAM for instruction storing (instruction RAM).

2. Description of Related Art

When debugging a semiconductor device by connecting an on-chip debugger thereto, the technique of preventing leakage of data is developed. For example, an on-chip debugger is disclosed in Japanese Laid-Open Patent Application No. 2003-186693 in which leakage of an internally stored program or data is prevented with certainty by a simple system when debugging a semiconductor device by connecting JTAG-I CE thereto. In this invention, outputting internal data outside is permitted only when an access key stored inside the semiconductor device is compared with an access key inputted from the outside and the two keys agree each other. By this system, the leakage of the data to a third party is prevented including an internally stored program.

In recent years, an assembling technique has progressed for semiconductor devices such as a system LSI, (Large Scale Integration) etc., and a product containing a plurality of chips in one package appeared. When a chip containing an instruction RAM (Random Access Memory) is mounted on this system LSI, there is a demand for preventing the leakage of the control program from the chip.

As a merit of using the chip containing an instruction RAM is alterations are made freely if needed compared with a Mask ROM (Read Only Memory), for which a control program must be coded beforehand, since the program is downloaded from the outside and stored in the RAM. Therefore, a change of a program is easily performed allowing any change possible, since the program is downloaded externally and modified, if necessary. As another merit of this RAM, a high-speed operation can be implemented compared with a mask ROM or a rewritable nonvolatile memory (flash memory). Furthermore, a RAM can be manufactured by a comparatively cheap process compared with a flash memory resulting in a low cost, which is also a merit for a supplier side.

However, there is a disadvantage in respect of security reservation of a program, since the system is configured such that a control program is downloaded from the outside and operated. Even though the data leakage is prevented during downloading, a downloaded program will be read out if memory is referred to from a debugger (debugger), after the completion of downloading. There is another problem such that even if the connection of a debugger to the semiconductor device is prohibited, and an access key is used as in the conventional technique, then there is no place for storing the access key because no nonvolatile memory is provided in the system. Here, it is necessary for an access key to be stored in a place where a program developer can access (setup) but a third party meet a difficulty with decoding the setup, and there is also an example in which the key is stored in the interior of a nonvolatile memory Therefore, the debugger function itself is made private for the chip containing the instruction RAM, and as a result decrease in program development efficiency or difficulties with fault analysis are caused. For such a chip and a debugger, realization of the above-mentioned merit has priority, and the protection of a program is given up, and an arrangement is not made for the prevention of the third party from illegal connection, such as a verification function of an access key, in many cases.

An example of a semiconductor device 90 (system LSI) with a plurality of chips are mounted thereon mentioned above is shown in FIG. 6, as a related art. FIG. 6 shows a product which stores a built-in chip A19 (for example, DSP: Digital Signal Processor) containing an instruction RAM, and a built-in chip B29 (for example, microcomputer) containing a nonvolatile memory. A dedicated debugger can be connected to each of the built-in chips A and B here, the control program of the built-in chip A19 is stored in the nonvolatile memory of the built-in chip B29, and downloaded with a unit to be provided when the built-in chip A19 is started. An operation flow is shown in FIG. 7. Concerning the control of the debugger connection by the built-in chip B29 containing the nonvolatile memory, security is secured by using the access key mentioned above. On the other hand, about the built-in chip A19 since downloading of a control program is performed inside a system LSI (S83-S86, S91-S94), there is no concern about the leakage, but when a debugger is connected, there is a risk of the leakage to a third party as mentioned above.

In order to be able to prevent leakage of a control program and to perform efficient debugging to the built-in chip A19 of such a system LSI, a debugger control unit is required to be able to specify permission/prohibition of the debugger connection by a third party.

However, it has not been taken into account that a plurality of chips are mounted on one package in such technology. Therefore, reference has not been made to effective control of debugging connection when a plurality of chips with a debugging function are mounted on one package. Especially when one of plurality of chips does not have a scheme of securing the security of a program at the time of debugging connection, for example, a security guarantee has to be given up for a chip with an instruction RAM mounted thereon.

Since the conventional debugger connection permission/prohibition control is performed such that a release code is inputted from the debugger side, collated with an access key stored in the interior, and a matching/mismatching judgment is made, so that hardware such as an access key register and a resource access circuit has to be increased, and the control software for the debugger becomes complicated.

When diverting the existing design property, especially diverting a built-in chip A19 with an instruction RAM mounted and an on-chip debugger, there is a request that a change accompanied by introduction of a debugger control unit be kept minimum.

Furthermore, when the debugging function itself is made private in order to prevent the leakage of the control program (instruction code) of the built-in chip A19 without controlling the debugger connection, decrease in program development efficiency or difficulties with fault analysis are caused.

Thus, there is a need of realizing the security function to prevent a third party from obtaining data illegally with using a debugger function in the semiconductor device containing the chip with a volatile memory (for example, RAM for storing instructions) mounted.

SUMMARY OF THE INVENTION

A semiconductor device includes a volatile memory for storing a first instruction group, a first processing unit for performing the first instruction group, a nonvolatile memory for storing a second instruction group, a second processing unit for performing a second instruction group, a control signal output unit for outputting a control signal to specify permission or prohibition of executing debugging function to the first processing unit, and a debug control unit for controlling execution of a debugging function to the first processing unit based on the control signal.

According to the present invention, in the semiconductor device having a built-in chip with a volatile memory (for example, RAM for instruction storing) mounted thereon, a security function can be provided to prevent a third party from obtaining data illegally using a debugger function. Thereby, the leakage can be prevented of data containing a control program etc. from the volatile memory mounted on the semiconductor device using the debugger function connected to the semiconductor device by the third party.

BRIEF DESCRIPTION OF THE DRAWINGS

The above and other exemplary aspects, advantages and features of the present invention will be more apparent from the following description of certain exemplary embodiments taken in conjunction with the accompanying drawings, in which.

DETAILED DESCRIPTION OF THE EXEMPLARY EMBODIMENTS

First Embodiment

Figure 1:
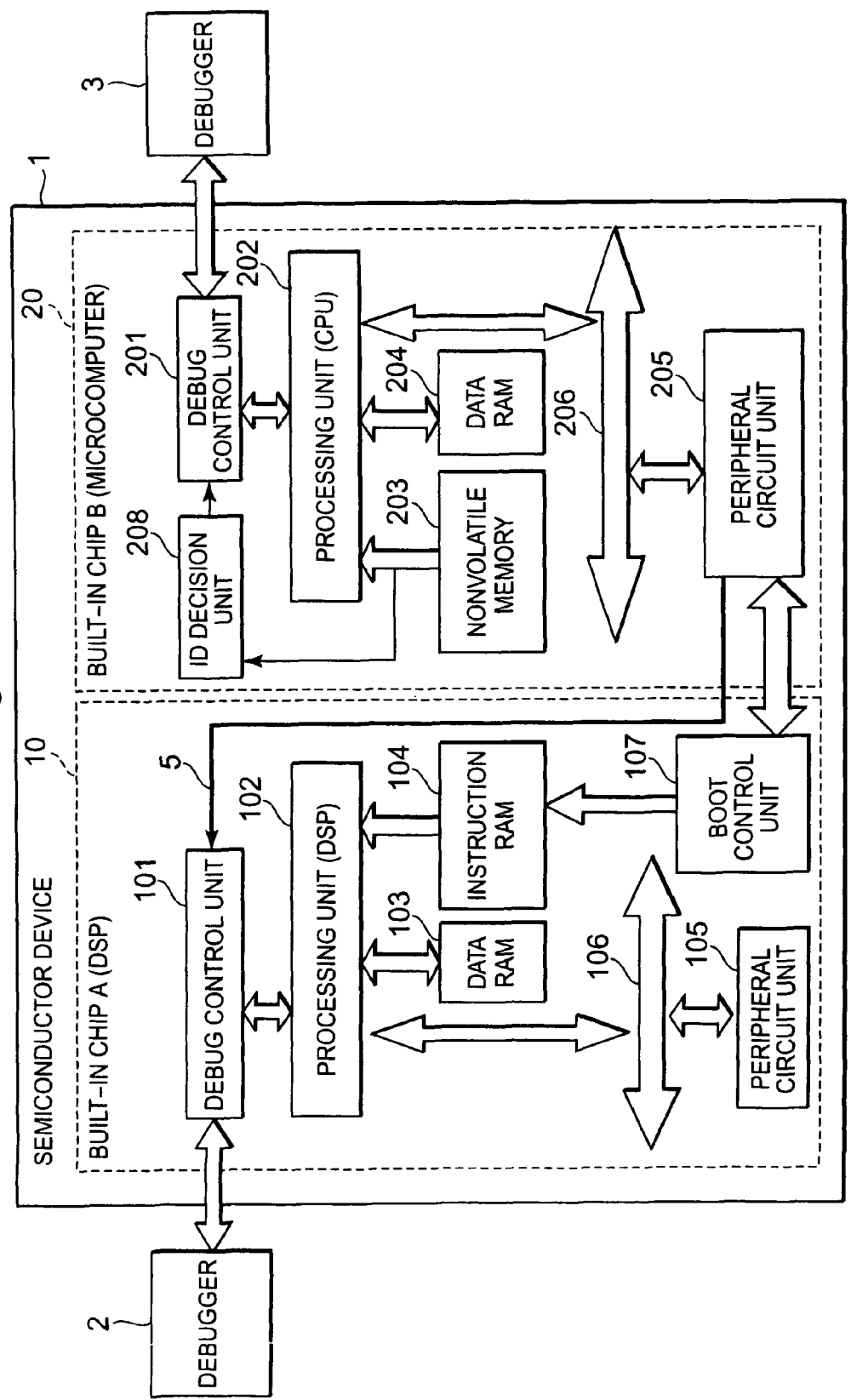
FIG. 1 is a block diagram showing an example of the configuration of the semiconductor device (system LSI) in accordance with the present invention.

FIG. 1 is a block diagram showing an example of configuration of the semiconductor device (system LSI) in accordance with the present invention. The semiconductor device 1 is constituted of two chips, a built-in chip A10 (first chip) and a built-in chip B20 (second chip) as shown in FIG. 1. For example, two chips are sealed in one package like a SiP (System in Package). Although an example constituted from two chips is explained here, another constitution is also possible such as a semiconductor device with a chip wherein the chip is divided into two regions, first and second regions, and each of them is arranged in the region on the same chip, respectively.

The semiconductor device 1 has a debugging function. Here, a debugging function is a function to connect an external debugger to the semiconductor device 1, and to inspect the execution of an instruction. The control of a debugging function is to specify permission or prohibition for the execution of a debugging function. As a debugging environment for a program, debuggers 2 and 3 (for example, on-chip debugger) are provided in the exterior of the semiconductor device 1 and connected to the built-in chips A10 and B20, respectively. Here, the debugger 2 is for the built-in chip A10, and the debugger 3 for the built-in chip B20.

The built-in chip A10 includes a debug control unit 101, a processing unit (DSP) 102, a data RAM 103, an instruction RAM 104, a peripheral circuit unit 105, a bus 106, and a boot control unit 107.

The debug control unit 101 is connected to the external debugger 2 and the processing unit (DSP) 102, and outputs the internal state of the processing unit (DSP) 102 following the command received from the debugger 2 to the debugger 2. Furthermore, the debug control unit 101 is specified to be in a ready state (High) or in an initialized state (Low) by the level of control signal 5. The built-in chip B20 sets up the level of the control signal 5 and outputs the signal 5. Here, two cases are explained, when the level of the control signal 5 is high (1), then the connection of the debugger 2 is permitted, and when the level of the signal 5 is low (0), then the connection is prohibited.

The processing unit (DSP) 102 fetches and executes an instruction code from the instruction RAM 104. This execution allows the DSP 102 to access the data RAM 103 and to access the peripheral circuit unit 105 via the bus 106.

The boot control unit 107 operates by a reset release (reset signal not shown) by the built-in chip A10, and load the program (instruction code group) to be execute by the processing unit (DSP) 102 from the exterior into the instruction RAM 104 (nonvolatile memory of the built-in chip B20 in FIG. 1).

The built-in chip B20 includes the debug control unit 201, the processing unit (CPU) 202, the nonvolatile memory 203, a data RAM 204, the peripheral circuit unit 205, a bus 206, and the ID decision unit 208. Security for such a program stored in the nonvolatile memory, is secured by the method of the conventional technology, etc.

For example, the built-in chip B20 specifies the connection permission/prohibition for the debugger 3 by collating ID code match/mismatch. Specifically, the ID code is stored in the nonvolatile memory, and another ID code inputted from the outside (inputted from the debugger 3 via the debug control unit 201) is collated with the ID code stored in the nonvolatile memory.

The processing unit 202 fetches and executes the instruction code stored in the nonvolatile memory 203. The nonvolatile memory 203 stores the instruction code to be executed in order that the built-in chip B20 realizes its own function, and in addition, stores an instruction code for the control of the built-in chip A10, an instruction code to be transmitted to the built-in chip A10, and the control information for the control of the debugging function of built-in chip A10 as well. The control information is that for specifying permission/prohibition for execution of the debugging function of the built-in chip A10, hence, the nonvolatile memory 203 stores the control information concerned with the connection of the debugger 2. In the present embodiment, in the following an explanation is given as the control information for the case where the processing unit 202 sets up the value of a control signal, and stores the instruction code to direct the debug control unit 101 to output.

The peripheral circuit unit 205 outputs a control signal to the debug control unit 101 following the processing unit 202 to execute an instruction. Since the usual functions of each component of the built-in chip B20 described above and the configuration of other built-in chip B20 are similar to those of personal computers with well-known nonvolatile memory (flash memory) mounted thereon, detailed explanation is omitted.

In the semiconductor device 1 of FIG. 1, the built-in chip B20 controls and manages a start (reset release), a stop (reset input) and an offer of an instruction code group (control program) for the built-in chip A10. In this embodiment, based on the control information the built-in chip B20 generates and outputs the control signal to the built-in chip A10, it to the built-in chip A10. Therefore, the built-in chip B20 controls to specify permission or prohibition for connecting the debugger 2 to the built-in chip A10. Examples of different control information from this embodiment are described in other embodiments in accordance with the present invention.

Furthermore, in the configuration of FIG. 1, when there is a component with the same name both in the internal memory A10 and in the internal memory B20, distinction is made between the two with numerals, and in addition "first" is attached to a component of the built-in chip A10, "second" to that of the internal memory B20, for example, first debug control unit.

Figure 2:
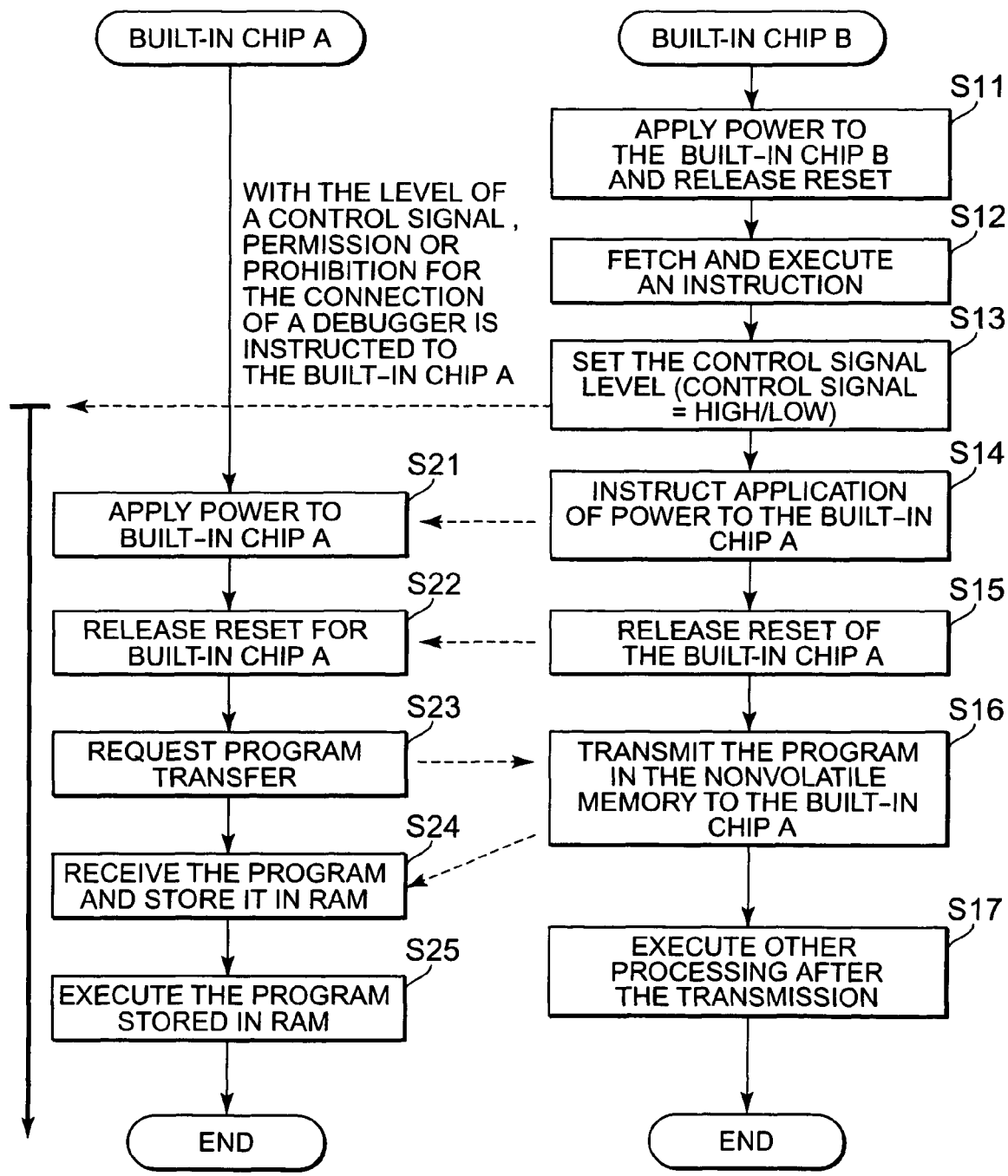
FIG. 2 is a flow chart showing an example of operation of the semiconductor device of the first exemplary embodiment.

Then, the operation of the semiconductor device 1 is explained. FIG. 2 is a flow chart to show an example of operation of the semiconductor device of this embodiment in accordance with the present invention. With reference to FIG. 2 the operation permitting the debugger 2 to connect to the built-in chip A10 is first explained. First, a power supply is applied to the built-in chip B20, and then a reset release is carried out (S11). At this time, the control signal 5 is set to Low as the initialization state. Next, the processing unit 202 fetches and executes an instruction from the nonvolatile memory 203 (S12). After the above procedure, the processing which the processing unit 202 performs is execution of the instruction fetched from the nonvolatile memory 203.

The instruction code to control the built-in chip A10 is contained in the instruction at this time. The processing unit 202 executes the instruction to set up the control signal 5, and sets the control signal 5 to High (S13). The control signal 5 set up is notified to the debug control unit 101. In the stage where the control signal 5 set to High is notified to the debug control unit 101, the built-in chip A10 becomes connectable with the debugger 2. In FIG. 2, the period shown by an arrow at the left end shows that the level of control signal 5 is High, and continuing. Then, the processing unit 202 directs application of the power supply of the built-in chip A10 (SI4). By this direction, the power supply of the built-in chip A10 is switched on (S21). The processing unit 202 directs the reset release of built-in chip A10 (S15). Reset of built-in chip A10 is canceled by this direction (S22). Thereby, the boot control unit 107 is operated and requests the built-in chip B20 to transfer a program (S23).

The processing unit 202 starts to transfer a program of the built-in chip A10 stored in the nonvolatile memory 203 to the built-in chip A10 (S16). The transmitted program is received by the built-in chip A10, and stored in the instruction RAM 104 (S24). After finishing the transfer of the program, the built-in chip B20 fetches and executes other instruction codes (S17). The built-in chip A10 fetches and executes the instruction of the program stored in the RAM (S25). The procedure described above is for the case wherein the connection of the debugger 2 is permitted.

Next, the operation is explained in the case where the connection of the debugger 2 to the built-in chip A10 is prohibited. Similar operation is performed except for Step S13. In Step 13, the processing unit 202 executes the instruction to set up the control signal 5, and sets the control signal 5 to Low. The control signal 5 thus set-up is notified to the debug control unit 101. In the stage where the control signal 5 set to Low is notified to the debug control unit 101, in the built-in chip A10, the connection of the debugger 2 to the built-in chip A10 is prohibited. In FIG. 2, the period shown by an arrow at the left end shows that the level of control signal 5 remains low, the same as in the initial state, and the state is continued wherein the connection of the debugger 2 is prohibited.

Figure 3:
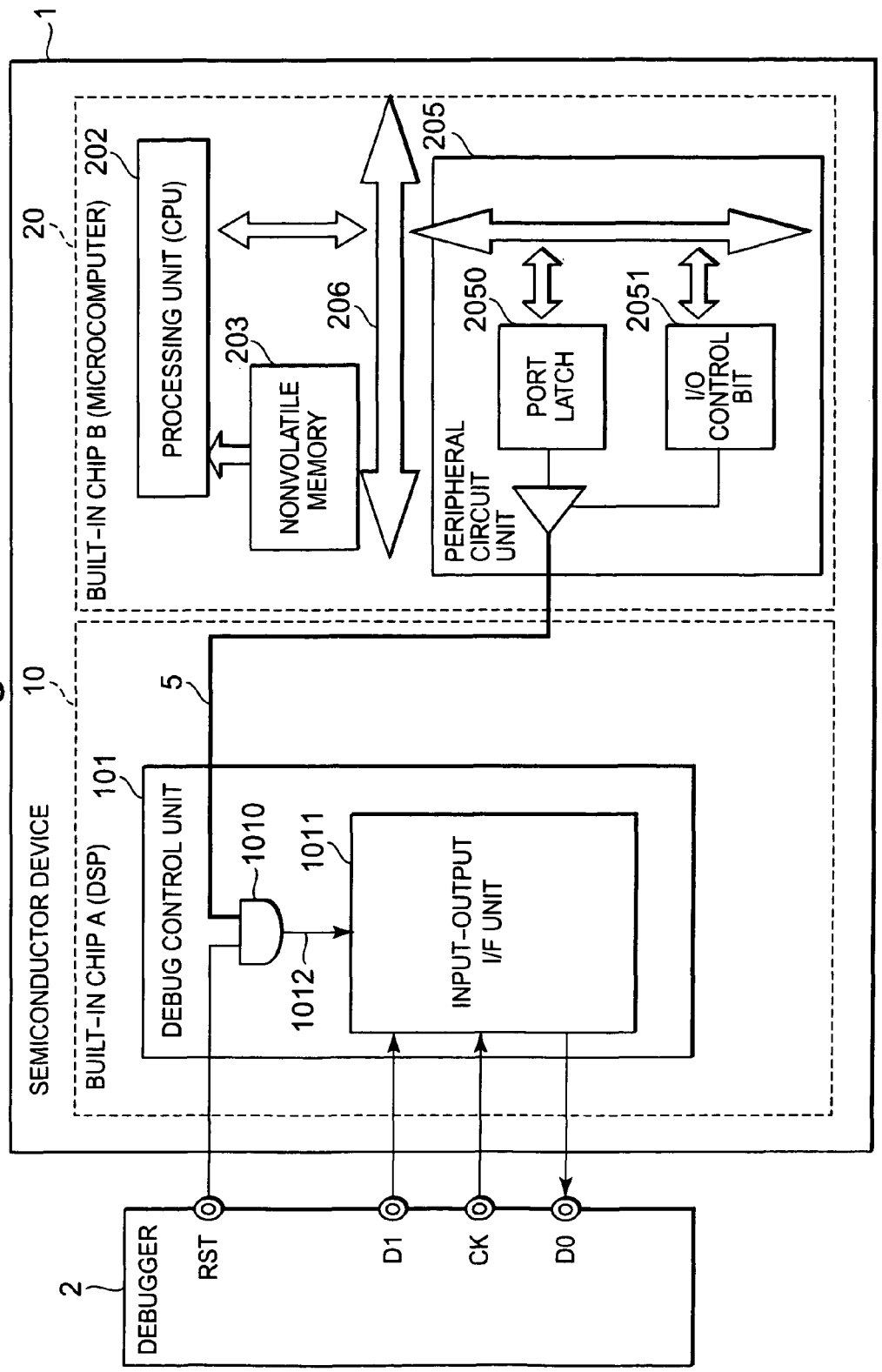
FIG. 3 shows a detailed configuration of the debug control unit included in the built-in chip A, the peripheral circuit unit included in the built-in chip B, and the control signal in the first embodiment.

FIG. 3 shows the detailed configuration of the debug control unit 101 equipped with the built-in chip A, the peripheral circuit unit 205 equipped with the built-in chip B, and the control signal 5 in accordance with an embodiment of the present invention.

For this reason, some components shown in FIG. 1 are omitted. In the built-in chip A10, the debug control unit 101 includes an AND circuit (AND circuit) 1010 and an input output □/F unit 1011 which controls I/O with the debugger 2. The built-in chip 20 is characterized in that the built-in chip 20 includes the peripheral circuit unit 205 having a port latch 2050 holding the value to be set to I/O port, and an I/O control bit 2051 which directs the output of the value held at the port latch 2050.

The control signal 5 is generated by the peripheral circuit unit 205. Accordingly, the control signal output unit is implemented with the nonvolatile memory 203 storing the instruction to set up the control signal 5, the processing unit 202 to execute an instruction, and the peripheral circuit unit 205 to hold and output the value of control signal 5. In the present embodiment, the processing unit (CPU) 202 executes an instruction code stored in the nonvolatile memory 203, and writes the data of permission/prohibition into the port latch 2050 of I/O (Input/output) port in the peripheral circuit unit 205. The port latch 2050 is initialized to Low level (0) by a reset input (not shown). A general IO port also has the specifications of input/output control. When outputting the control signal 5, it is necessary to write 0 to the I/O control bit 2051 and to set it to an output mode.

After release of the reset input, the control signal 5 is a Low level, and becomes a High level if "1" is written in the port latch 2050, and becomes a Low level if "0" is written.

The debug control unit 101 controls the connection to the debugger 2 by inputting the control signal 5. According to the present embodiment, the AND circuit 1010 performs AND of the control signal 5 and the input signal from the RST terminal, i.e. input from the exterior. The output of the AND circuit 1010 is inputted into the input-output □/F unit 1011 as an input-output signal 1012. The input-output □/F unit 1011 controls input-output with the debugger 2 based on the input-output signal 1012. The input-output signal 1012 continues Low level (initialization state) as long as the control signal 5 is Low level even if the RST terminal input becomes high level (initialization release). The input-output signal 1012 becomes a High level when the RST terminal input becomes high level and the control signal 5 becomes a High level.

In FIG. 3, since the debug control unit 101 does not operate during the period the input-output signal 1012 is a Low level, the command from the debugger 2 is ignored and a connection prohibiting state can be implemented. When the input-output signal 1012 is set to a High level, the operation of the debug control unit 101 becomes ready and the debugging function operates by the command reception from the debugger 2.

The whole operation is as the following two.

(1) port latch 2050=0 write

→control signal 5=Low level

→RST release (High) however also continues input-output signal 1012=Low level.
→prohibition of debugger 2 connection
(2) port latch 2050=1 write
→control signal 5=High level
→by RST release input-output signal 1012=High level
→permission of debugger 2 connection Whether write "0" or "1" to the port latch 2050 is decided by the stored program (instruction code of built-in chip B20) in the nonvolatile memory 203 mounted on the built-in chip B20. In the program development stage of the built-in chip A10, an instruction code to write "1" to the port latch 2050 may be stored so that the connection of the debugger 2 is possible. After the program development of built-in chip A10 is completed, another instruction code, to be stored in the nonvolatile memory 203, to write "0" to the port latch 2050 is able to prohibit the connection of the debugger 2.

Thereby, the leakage of a program can be prevented.

Therefore, the nonvolatile memory 203 stores the programs of the built-in chip B20, the programs of the built-in chip A10, and the instruction code for the port latch 2050 setup (one mode of control information). As for the nonvolatile memory 203 of the built-in chip B20, security is secured by the conventional technology and a program does not leak out from here.

As explained above in this embodiment of the present invention, the processing unit 202 of the built-in chip B20 sets the control signal 5 based on the program (one mode of control information) stored in the nonvolatile memory 203. In the built-in chip A10 the debugging state is set up by the control signal 5 notified from the built-in chip B20 whether to permit or to prohibit the connection of the debugger 2. Thus, in the built-in chip A10, the debugging state is controlled based on the control of the built-in chip B20. The debugging state is set up based on the control information stored in the nonvolatile memory of the built-in chip B20.

Since the control signal 5 is outputted from the built-in chip B20 which is in the same semiconductor device 1, the permission/prohibition control of the debugger connection to the built-in chip A10 can be performed without increasing hardware such as an access key register, a resource access circuit, etc., and without complicating software of the debugger 2.

Since the control of connecting the debugger 2 can be performed, such problems can be solved as the prevention from leakage of the control program of the built-in chip A 10, the improvement in efficiency at the program development, and facilitating of fault analysis. Since the IO port (port latch 2050 and □/O control bit 2051) of the peripheral circuit unit 205 has a function similar to those mounted on the usual microcomputer (microcomputer), the built-in chip B20 does not need any special modification. The increase in circuitry of the debug control unit 101 is also little, and can be implemented.

In addition, in this embodiment, although the explanation is made assuming the built-in chip A10 is a DSP, and the built-in chip B20 is a microcomputer, the both chips are not necessarily restricted to these. If an arrangement is made in a system such that a volatile memory is arranged on one side, and a nonvolatile memory is arranged on the other side, with each side including a processing unit, then the embodiment of the present invention can be applied to this system. As an example of memory, a RAM may be used as a volatile memory, and a ROM, a flash memory, etc. may be used as a nonvolatile memory.

Second Embodiment

In the second exemplary embodiment, an explanation is given to one mode where a debugging state of the built-in chip A10 is controlled by using the signal for controlling the debugging state of the built-in chip B20. Here, the case is explained where the control signal 5 is generated based on the decision result of the ID decision unit 208 which controls the debugging state of the built-in chip B20.

Figure 6:
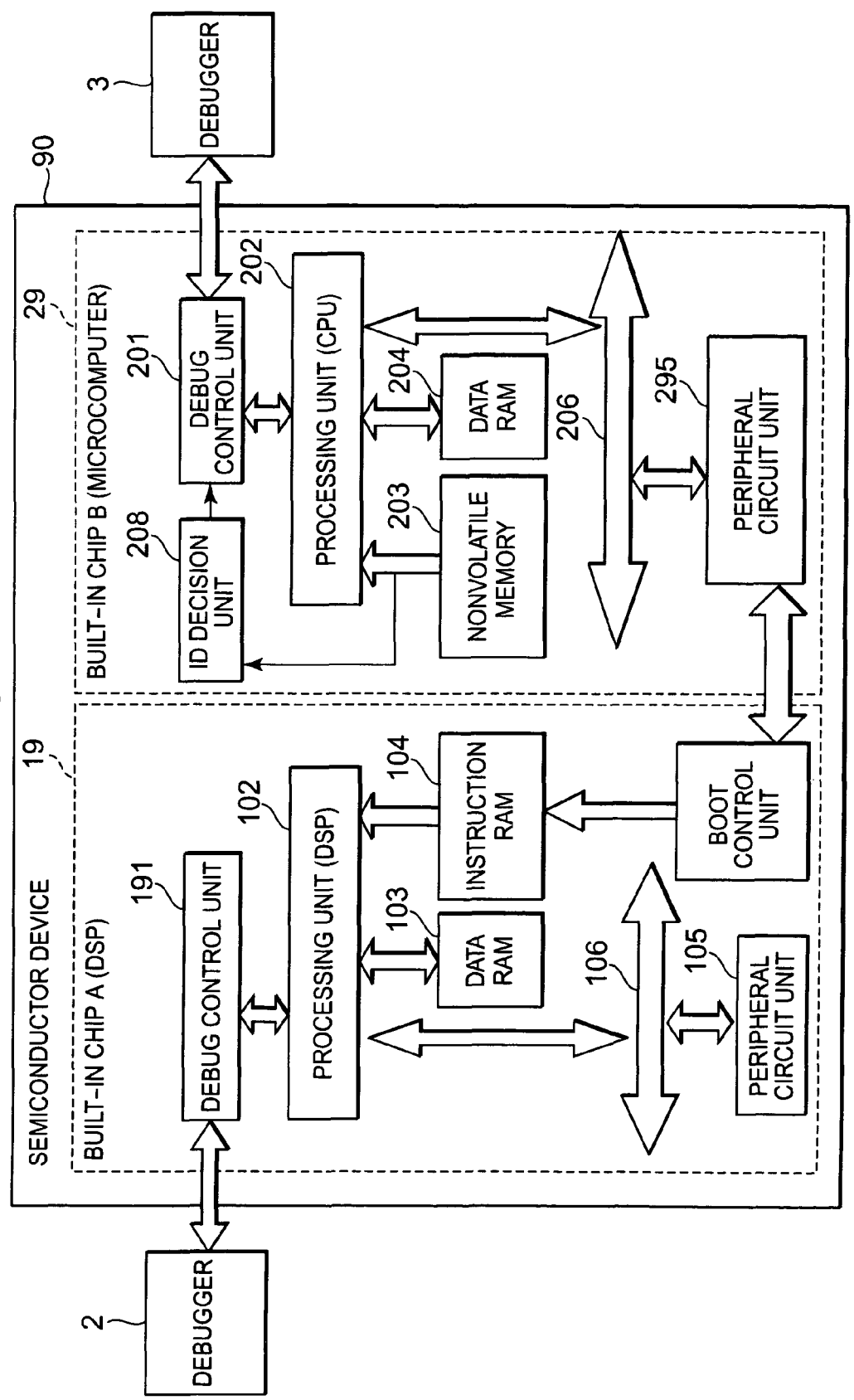
FIG. 6 shows an example of the conventional system LSI with a plurality of chips mounted thereon.
Figure 7:
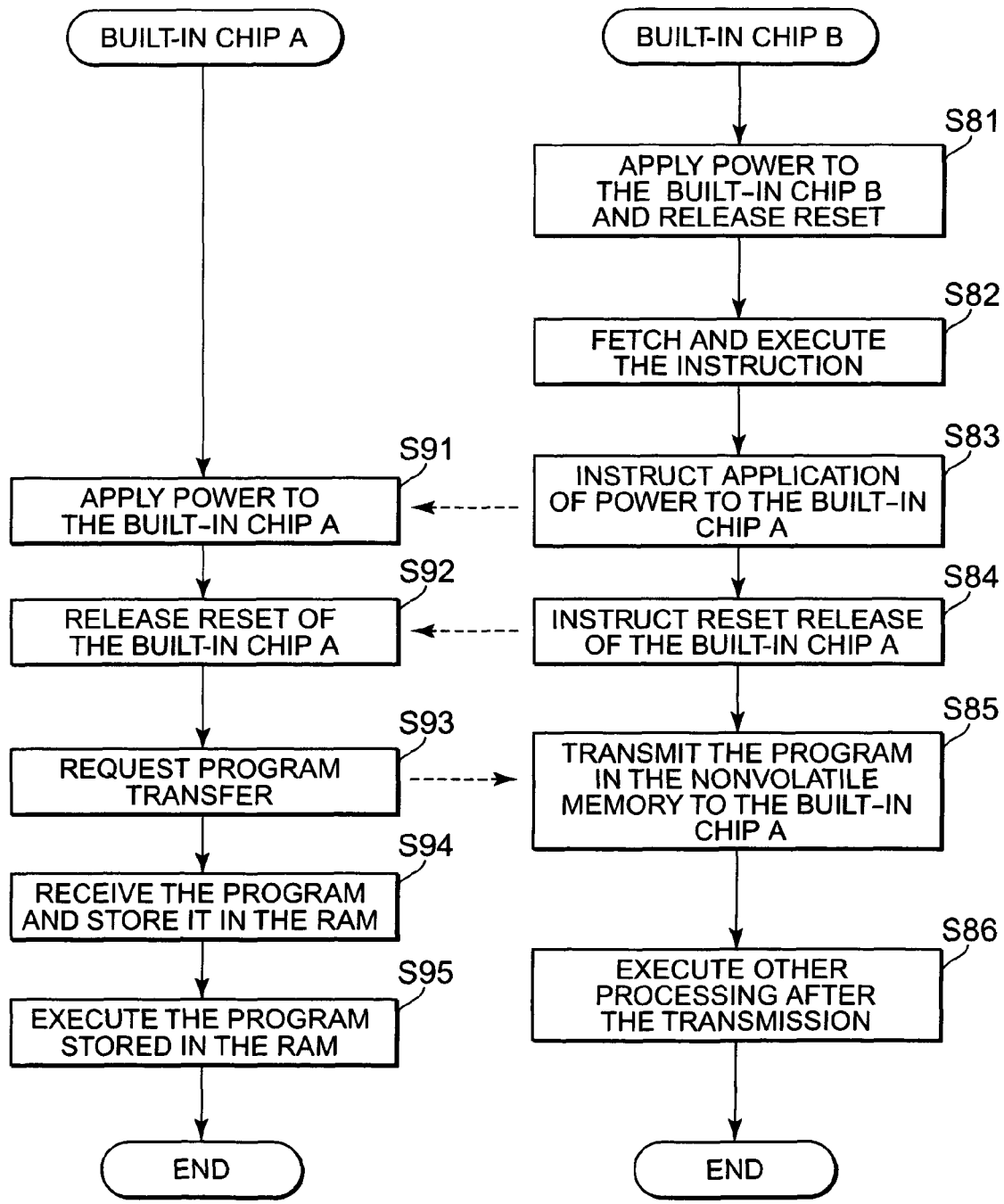
FIG. 7 is a flow chart showing an example of operation of a system LSI with a plurality of chips mounted thereon of a related art.

Since the whole configuration of semiconductor device 6 of this embodiment is the same as that of FIG. 1, explanation is omitted. However, the output source of control signal 5 differs and is not outputted from the peripheral circuit unit 205, but the signal outputted from ID decision unit 208 branches, and one of the branches becomes the control signal 5. Accordingly, the peripheral circuit unit 205 becomes the similar configuration as a peripheral circuit unit 295 of FIG. 6.

Figure 4:
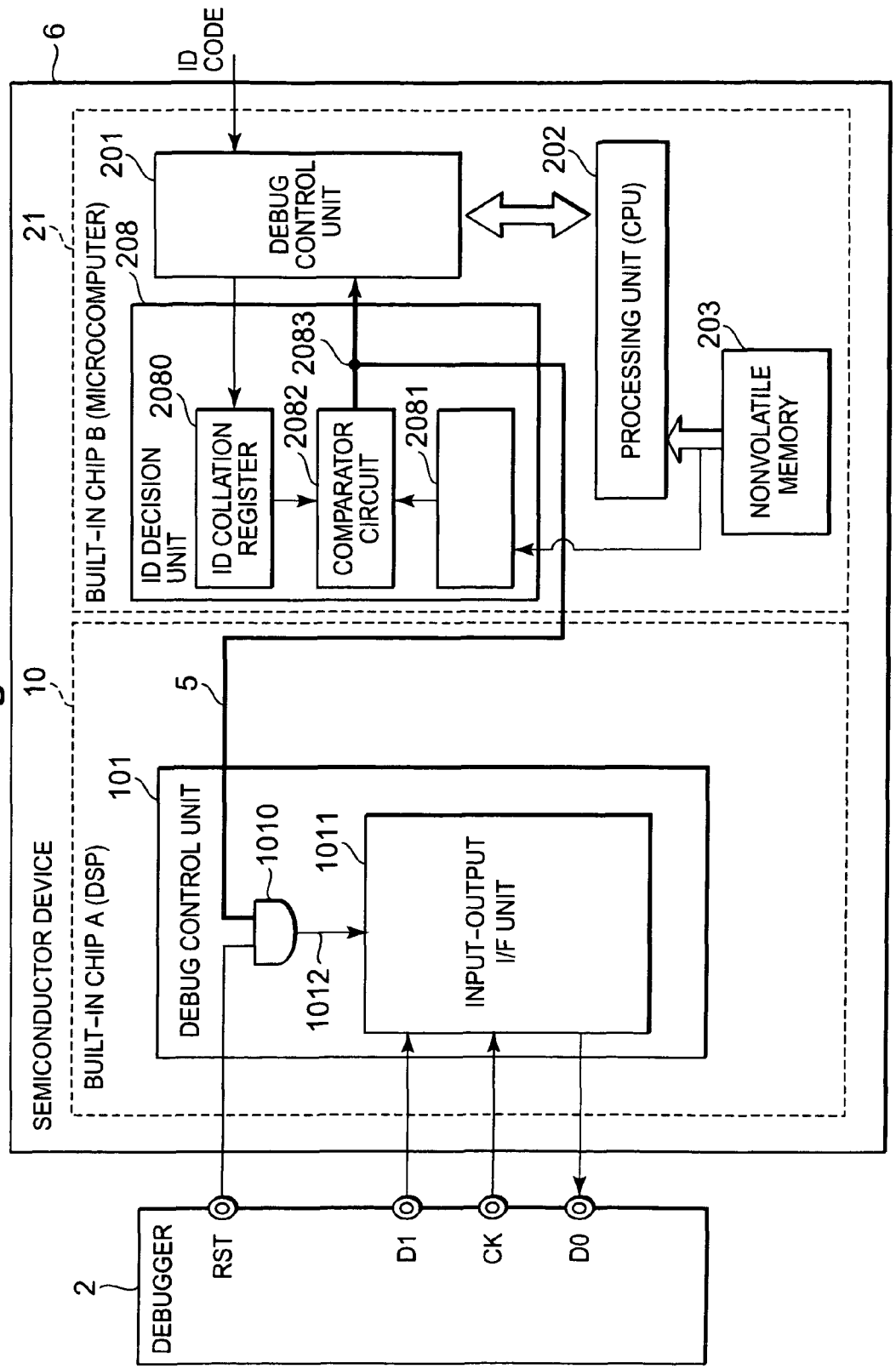
FIG. 4 shows a detailed configuration of the debug control unit included in the built-in chip A, the ID deciding unit included in the built-in chip B, and the control signal in the second exemplary embodiment.

FIG. 4 is a detailed drawing to show the configuration of a debug control unit 101 contained in the built-in chip A, that of the ID decision unit 208 in the built-in chip B20, and the composition of control signal 5. A control signal output unit is implemented by the configuration that the control signal 5 branches from the output of an ID decision unit in a built-in chip B21 shown in FIG. 4.

The ID decision unit 208 judges the permission/prohibition of connection of the debugger 3 to the built-in chip B20 by the collation of an ID code (matching data).

The ID decision unit 208 includes an ID collation register 2080, an ID storing register 2081, and a comparator circuit 2082.

The ID code inputted (refer to FIG. 1) from the debugger 3 is set to the ID collation register 2080 via the debug control unit 201. The ID code (collation information) stored in the prescribed address from the nonvolatile memory 203 is set to the ID storing register 2081.

The comparator circuit 2082 compares ID codes set in the ID collation register 2080 and the storing register 2081, and outputs a resulting signal 2083 of comparison to the debug control unit 201. The ID decision unit 208 permits the debugging state of connecting the debugger 3 to the built-in chip B20, when two I D codes are in agreement, and prohibits the connection when not in agreement. According to this embodiment, a branch of the resulting signal 2083 of comparison is supplied to the debug control unit 101 as the control signal 5. Since the composition of debug control unit 101 of the built-in chip A10 is similar to that of FIG. 3, explanation is omitted.

In this embodiment an explanation is given to the mode where the ID code stored in the nonvolatile memory 203 and collated when judging the debugging state of the built-in chip B20 is made the control information in connection with level setting (generation of control signal 5) of the control signal 5. The control signal 5 is generated using the resulting signal 2083 of comparison for judging the debugging state of the built-in chip B20. For this reason, it is not necessary to store the program for specifying the control signal 5 in the nonvolatile memory 203, and the composition and procedure of the debugger 2 connection permission/prohibition of the built-in chip B20 can be used.

In this way, the debugging state of the chip having a volatile memory can be controlled utilizing the conventional functions of the built-in chip B20 (namely, chip provided with nonvolatile memory). However, the built-in chip A10 and the debugging state of the built-in chip B20 are linked together. For this, when debugging the built-in chip A10, connection of the debugger 2 of the built-in chip B20 is permitted.

In addition in this embodiment, an explanation is given to the case where the control signal is generated to specify permission or prohibition of execution of the debugging function to the built-in chip A10 by using the result of decision by the ID decision unit 208 of for and against the execution of the debugging function to the built-in chip B20. Without restricted to the case mentioned above, other cases are also possible where a control signal is generated by collating the information inputted from the outside with the data stored in a nonvolatile memory for collation. Although circuitry increases, the result of decision by the built-in chip B20 is not used, but the collation information for the built-in chip A to judge for and against to execute the debugging function to the built-in chip A10 is made to store in the nonvolatile memory 203. A collating unit may be separately arranged for the built-in chip A (control signal output unit) in the built-in chip B 20 to collate the collation information for the built-in chip A with the information inputted from the outside.

Third Embodiment

In the third exemplary embodiment, an explanation is given to one mode where the security is strengthened for the data stored in a specific memory in the debug control unit to control the input-output of the debugger 2. Specifically an example of a scheme is explained where the leakage of the data stored in a specific volatile memory is prevented based on the level of control signal 5 in the debug control unit. The configuration of a semiconductor device is the same as that of FIG. 1. However, the output source of control signal 5 may be either of those in first embodiment 1 (FIGS. 1 and 3) or in second embodiment (FIG. 4). The detailed configuration of the input-output □/F unit a debug control unit is equipped therewith is different.

Figure 5:
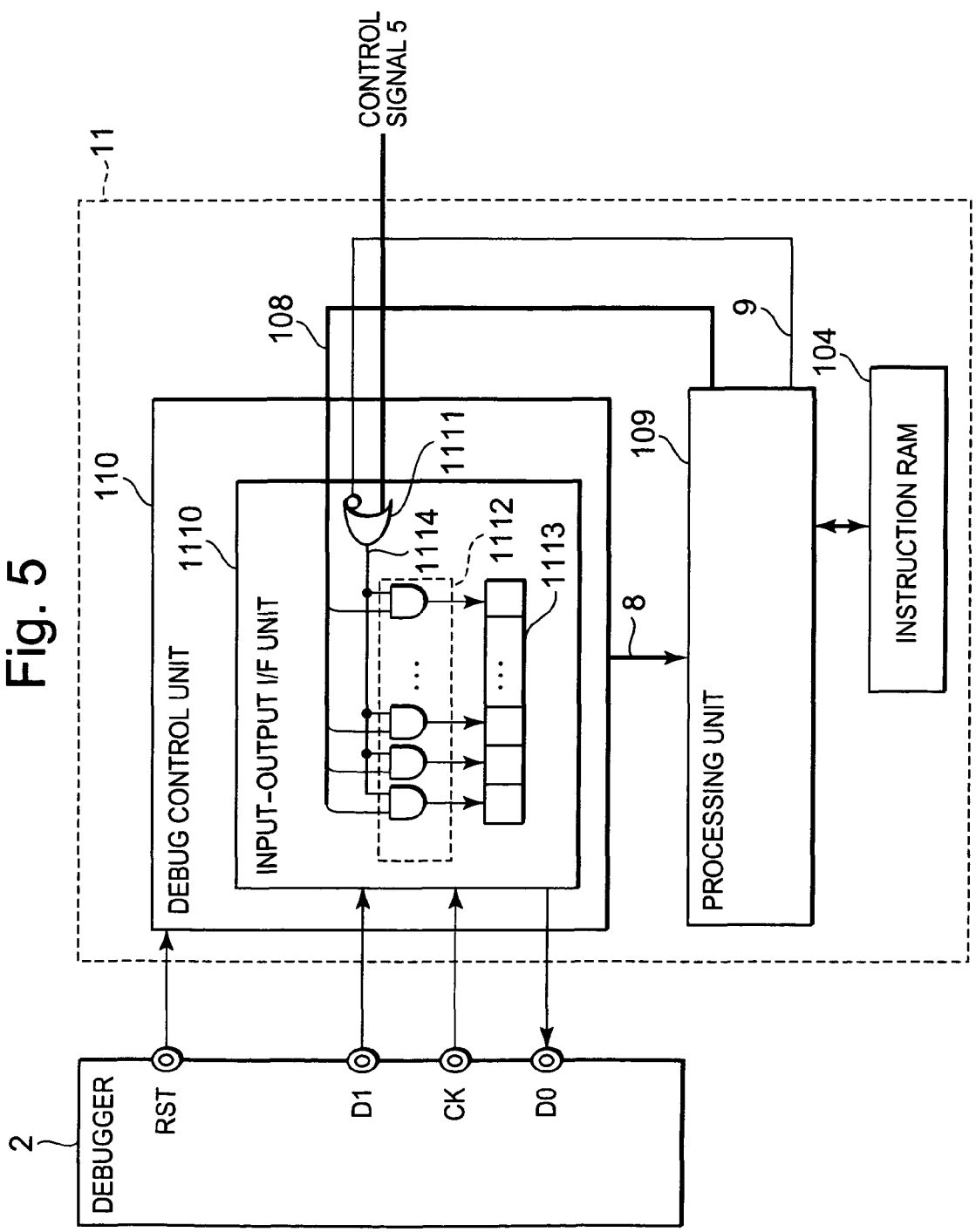
FIG. 5 shows an example of the configuration of the debug control unit in the third exemplary embodiment.

FIG. 5 is a drawing showing an example of the configuration of a debug control unit 110 of this embodiment. FIG. 5 shows the relation of the debug control unit 110, the debugger 2, and some components in the built-in chip A11. The input-output □/F unit 1110 shown in FIG. 5 includes an OR circuit (OR circuit) 1111, an AND gate 1112, and a shift register 1113. The number of AND circuits which the AND gate 1112 has and the number of the registers are in agreement.

First, the outline of operation of the debugger 2, the debug control unit 110, and a processing unit 109 is explained. The internal bus 108 is a bus for connecting the debug control unit 110 and the processing unit 109. The debug control unit 110 takes in the command inputted from the debugger 2, and outputs an access-control signal 8 (read execution instruction of instruction RAM 104) to the processing unit 109. The processing unit 109 executes processing based on the access-control signal 8 (instruction RAM 104 read). Next, the processing unit 109 transmits a processing result (instruction RAM read value) to the debug control unit 110 via the internal bus 108.

Here, the processing unit 109 activates an instruction RAM read value output signal 9 (High level). The point in which the instruction RAM read value output signal 9 (High level) is activated is a different point from the processing unit 102 shown in FIG. 1.

Then, the component of input-output □/F unit 1110 is explained. The input-output □/F unit 1110 inputs the control signal 5 and the instruction RAM read value output signal 9, and outputs the access-control signal 8. The OR circuit 1111 inputs control signal 5 and instruction RAM read value output signal 9, and outputs an OR as a data mask signal 1114.

In the AND gate 1112, for each AND circuit, every bit of the data inputted from the internal bus 108 is connected to one input, and the data mask signal 1114 is connected to the other input. The output of the AND gate is each stored in the shift register 1112, respectively. The data mask signal 1114 is a signal from the OR operation of the control signal 5 and the instruction RAM read value output signal 9 here. The shift register 1113 stores the output of the AND gate 1112, and outputs to the debugger 2 at DO terminal synchronized with a CK signal.

Next, the data mask signal 1114 is explained. An example of the data mask signal 1114 generation logic is shown in Table 1.

TABLE 1

| Control signal 5 | Instruction RAM read value Output signal 9 | Data mask signal 1114 |
| --- | --- | --- |
| L | L | H |
|   | H | L |
| H | L | H |
|   | H | H |

Here, when the control signal 5 is a Low level, connection prohibition is specified for the debugger 2. If the instruction RAM read value output signal 9 is set to a High level, then the data mask signal 1114 becomes a Low level and an AND-gate output a Low level and fixed. Therefore, the stored data of shift register 1113 does not depend on the value of internal bus 108, but is always set to 0. Thus, when the control signal 5 is a Low level, the data which read the instruction RAM is not outputted outside from the DO terminal, therefore, the security of the data (instruction code) stored in the instruction RAM 104 is protected.

When the control signal 5 is a High level, and when the control signal 5 is a Low level and the instruction RAM read value output signal 9 is a Low level, the value of the internal bus 108 is stored in the shift register 1112 and outputted to a debugger from the DO terminal. However, since the data outputted is except the data stored in the instruction RAM 104, there is no problem of security. In this manner, the security of the data stored in instruction RAM 104 is guaranteed.

In this embodiment, the debug control unit 110 receives the access instruction of those other than RAM 104 among the instructions inputted from the debugger 2, even if the level of control signal 5 is Low. Consequently, debugging of those other than the data display stored in the instruction RAM 104 can be performed. Therefore, for a designer with some program information, it is possible to perform minimum debugging a sample with the fixed control signal 5=Low in order to supply to the market. Accordingly, the feature described above is effective when using the debugging function before putting the semiconductor device onto the market or the subsequent claim analysis etc.

By this embodiment, the composition which does not make the data of internal bus 108 outputted to debugger 2 can be implemented in this way only at the time of the read of instruction RAM 104. For this reason, leakage of the data stored in instruction RAM 104 can be prevented. That is, leakage of the data stored in specific volatile memory can be prevented. A debugging function can be performed about access to the memory whose prevention of leakage of data is unnecessary, preventing data disclosure of specific memory.

According to the suitable embodiment concerning the present invention, as mentioned above, illegal leakage of the control program of a chip with a volatile memory, for example, RAM for instruction storing (instruction RAM 104) mounted thereon, can be prevented. Besides, since the connection of a debugger can be performed based on a control signal, improvement in development efficiency of a program or facilitating fault analysis can be accomplished.

The above-mentioned effect can be implemented without increase in hardware such as an access key register, and a resource access circuit, and in complication of control software of the debugger 2 side since the control signal 5 from other built-in chips (here built-in chip B20) arranged in the semiconductor device is outputted again.

The present invention is not limited to the embodiments shown above. Within the scope of the present invention, it is possible for a person skilled in the art to change, to add and to convert each element of the above-mentioned embodiments into the contents which can be easily considered.

Further, it is noted that, Applicant's intent is to encompass equivalents of all claim elements, even if amended later during prosecution.

What is claimed is:

1. A semiconductor device capable of being coupled to first and second debuggers, the first and second debuggers being capable of debugging a program in the semiconductor device, the semiconductor device, comprising:
    a nonvolatile memory that stores the program including first and second instruction groups and an ID code, the ID code stored in the nonvolatile memory being compared with an ID code inputted from the second debugger to control permission or prohibition of a connection configuration to the second debugger;
    a first processing unit which executes the first instruction group;
    a second processing unit which executes the second instruction group;
    a control signal output unit which generates a control signal indicative of permission or prohibition of a debugging function to the first processing unit;
    a first debug control unit capable of being coupled to the first debugger to control a communication with the first debugger in response to the control signal; and
    a second debug control unit capable of being coupled to the second debugger to control a communication with the second debugger.

2. The semiconductor device according to claim 1, wherein the second instruction group includes an instruction, and the control signal output unit generates said control signal produced based on a value set up by executing said instruction.

3. The semiconductor device according to claim 2, wherein the control information includes a collation information to be collated with an information inputted from an outside, and the control signal is generated based on a collation result of the collation information and the information inputted from the outside.

4. The semiconductor device according to claim 1, wherein the nonvolatile memory stores a control information and the control signal output unit generates said control signal produced based on the control information.

5. The semiconductor device according to claim 1, wherein the first debug control unit includes a register which stores a data of the first instruction group read from the volatile memory.

6. The semiconductor device according to claim 5, wherein said data of the first instruction group is not stored in said register when the execution of the debugging function is prohibited.

7. The semiconductor device according to claim 1, further comprising:
    a volatile memory,
    wherein the first instruction group is transferred from the nonvolatile memory to the volatile memory if the control signal indicates permission of the debugging function to the first processing unit.

8. The semiconductor device according to claim 7, wherein the first processing unit, the volatile memory and the first debug control unit are mounted on a first chip, and the second processing unit, the nonvolatile memory, the second debug control unit and the control signal output unit are mounted on a second chip.

9. A semiconductor device capable of being coupled to first and second debuggers, the first and second debuggers being capable of debugging a program in the semiconductor device, the semiconductor device, comprising:
    a first chip; and
    a second chip that is coupled to the first chip,
    wherein the first chip comprises:
        a first processing unit that executes the first instruction group; and
        a first debug control unit capable of being coupled to the first debugger to control a communication with the first debugger,
    wherein the second chip comprises:
        a nonvolatile memory that stores the program including a first and second instruction groups;
        a second processing unit that executes the second instruction group;
        a second debug control unit capable of being coupled to the second debugger to control a communication with the second debugger; and
        a control signal output unit that generates a control signal indicative of permission or prohibition of a debugging function to the first processing unit, and
    wherein the first debug control unit controls a connection configuration to the first debugger in response to the control signal.

10. The semiconductor device as claimed in claim 9, wherein the second instruction group includes an instruction, and the control signal output unit generates said control signal produced based on a value set up by executing said instruction.

11. The semiconductor device as claimed in claim 10, wherein said second chip further comprises a port latch which is set into a first value or a second value corresponding to the value.

12. The system in package as claimed in claim 9, said second chip further comprising an identification data decision unit which compares said information with an identification data inputted outside of said system in package to produce said control signal.

13. The system in package as claimed in claim 9, wherein said debug controller includes an input/output interface unit which accepts for said debugger to read out an information on an internal bus in said first chip when said control signal has said first state, accepts for said debugger to read out said information on said internal bus when said control signal has said second state and said volatile memory is not in a read-out state, and prohibits said debugger from reading out said information on said internal bus when said control signal has said second state and said volatile memory is in said read-out state.

14. The system in package as claimed in claim 9, wherein said first chip is responsive to a release of a reset from said second chip to request to said second chip a transfer from said program in said second memory into said first memory.

15. The semiconductor device according to claim 9, wherein the nonvolatile memory further stores an ID code, the ID code stored in the nonvolatile memory being compared with an ID code inputted from the second debugger to control a connection configuration to the second debugger.

16. The semiconductor device according to claim 9, wherein the second chip further comprises a volatile memory, and
   wherein the first instruction group is transferred from the nonvolatile memory to the volatile memory if the control signal indicates permission of the debugging function to the first processing unit.

17. A method of debugging a program in a semiconductor device by a first and second debuggers, the semiconductor device comprising a first and second chips, the first chip including a first processing unit and a first debug control unit, the second chip including a second processing unit, a nonvolatile memory storing the program and an ID code, and a second debug control unit, the method comprising:
   debugging the program executed by the first processing unit; and
   debugging the program executed by the second processing unit,
   wherein the debugging the program executed by the second processing unit includes:
      coupling the second control unit to the second debugger;
      inputting an ID code from the second debugger to the second chip;
      reading the ID code from the nonvolatile memory;
      comparing the ID code inputted from the second debugger with the ID code read from the nonvolatile memory to control permission or prohibition of a connection configuration to the second debugger;
      generating a control signal on the second chip; and
      outputting the control signal from the second chip to the first chip, and
   wherein the debugging the program executed by the first processing unit includes:
      coupling the first debug control unit to the first debugger;
      executing the transferred program by the first processing unit,
      receiving the control signal outputted from the second chip; and
      determining, based on the control signal, whether a connection configuration with the first debugger is permitted.

18. The method as claimed in claim 17, further comprising:
   storing said information into a register; and
   comparing said information in said register with information inputted from outside of said semiconductor device.

19. The method as claimed in claim 17, wherein said accepting includes an accepting for said debugger to read out said condition on an internal bus produced by said second process when said second state is indicated and said volatile memory is not in a read-out state, and said prohibiting includes prohibiting said debugger from reading out said condition on said internal bus when said second state is indicated and said volatile memory is in said read-out state.

20. The method according to claim 17, wherein the semiconductor device further comprises a volatile memory, and wherein the debugging of the program executed by the first processing unit further includes:
   transferring the program to be executed by the first processing unit from the nonvolatile memory to the volatile memory if a result of the determining of whether the connection configuration is permitted indicates that the connection configuration with the first debugger is permitted.

21. A chip for a semiconductor device capable of being coupled to first and second debuggers, the first and second debuggers being capable of debugging a program in the semiconductor device, the semiconductor device including an other chip that is coupled to the chip, and the chip comprising:
   a first processing unit that executes the first instruction group; and
   a first debug control unit capable of being coupled to the first debugger to control a communication with the first debugger,
   wherein the other chip comprises:
      a nonvolatile memory that stores the program including a first and second instruction groups;
      a second processing unit that executes the second instruction group;
      a second debug control unit capable of being coupled to the second debugger to control a communication with the second debugger; and
      a control signal output unit that generates a control signal indicative of permission or prohibition of a debugging function to the first processing unit, and
   wherein the first debug control unit controls a connection configuration to the first debugger in response to the control signal.

22. A chip for a semiconductor device capable of being coupled to first and second debuggers, the first and second debuggers being capable of debugging a program in the semiconductor device, the semiconductor device including an other chip that is coupled to the chip, the other chip including a first processing unit that executes the first instruction group, and a first debug control unit capable of being coupled to the first debugger to control a communication with the first debugger, and the chip comprising:
   a nonvolatile memory that stores the program including a first and second instruction groups;
   a second processing unit that executes the second instruction group;
   a second debug control unit capable of being coupled to the second debugger to control a communication with the second debugger; and
   a control signal output unit that generates a control signal indicative of permission or prohibition of a debugging function to the first processing unit,
   wherein the first debug control unit controls a connection configuration to the first debugger in response to the control signal.

* * * * *